M. A. GIBBONS.
CORN HARVESTER AND HUSK BALER.
APPLICATION FILED DEC. 23, 1910.
1,017,625.
Patented Feb. 13, 1912.
5 SHEETS—SHEET 5.
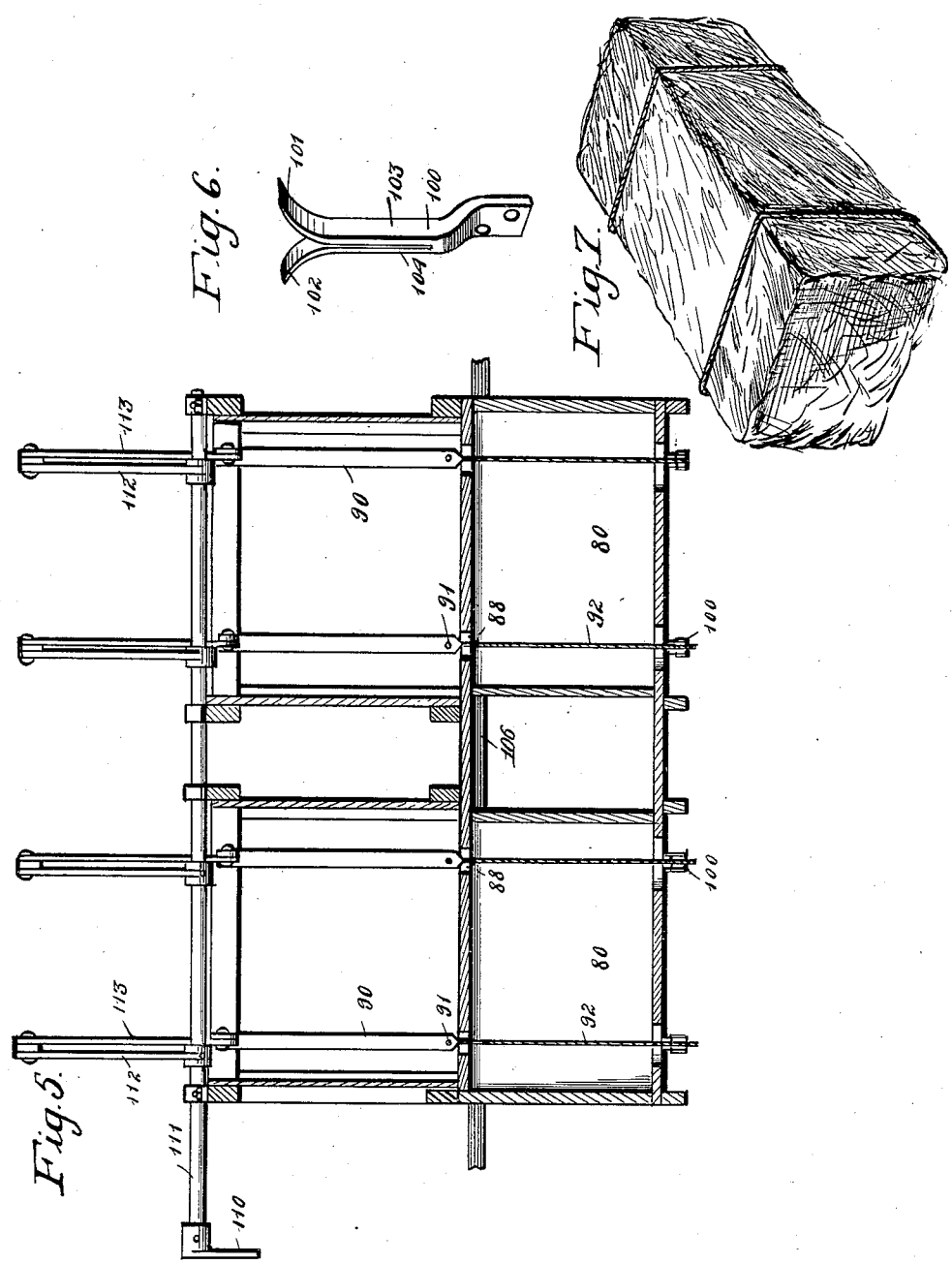

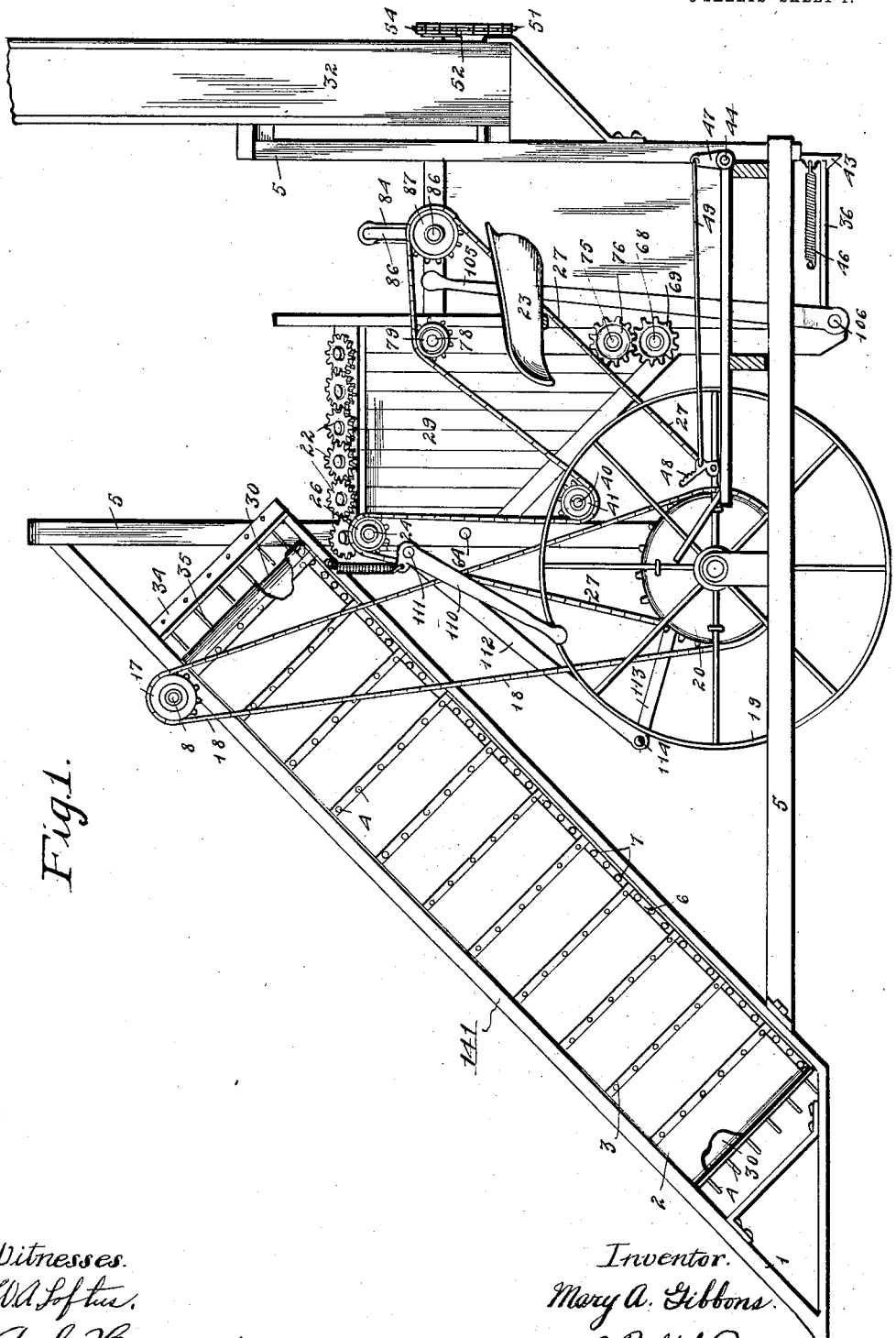

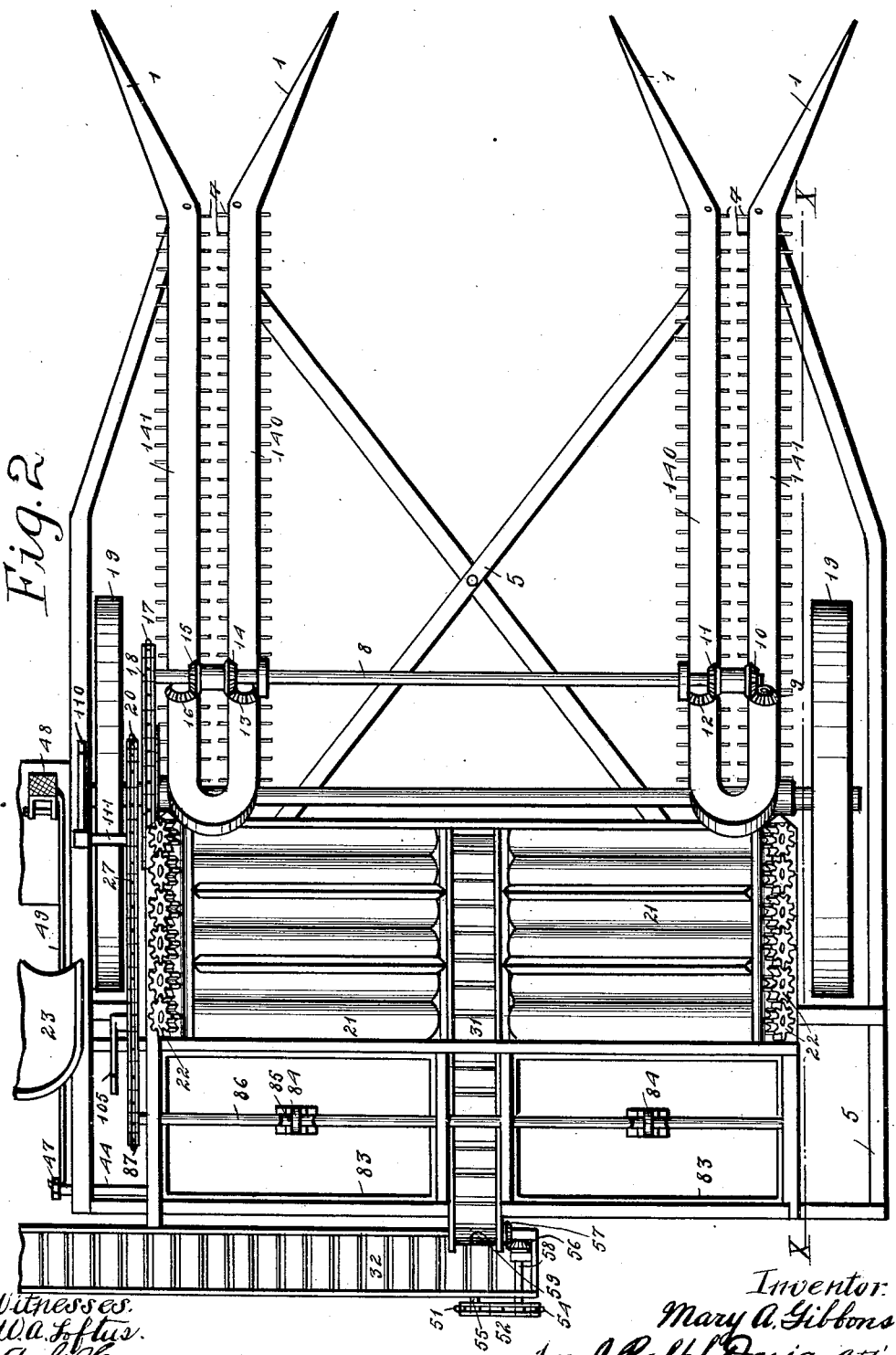

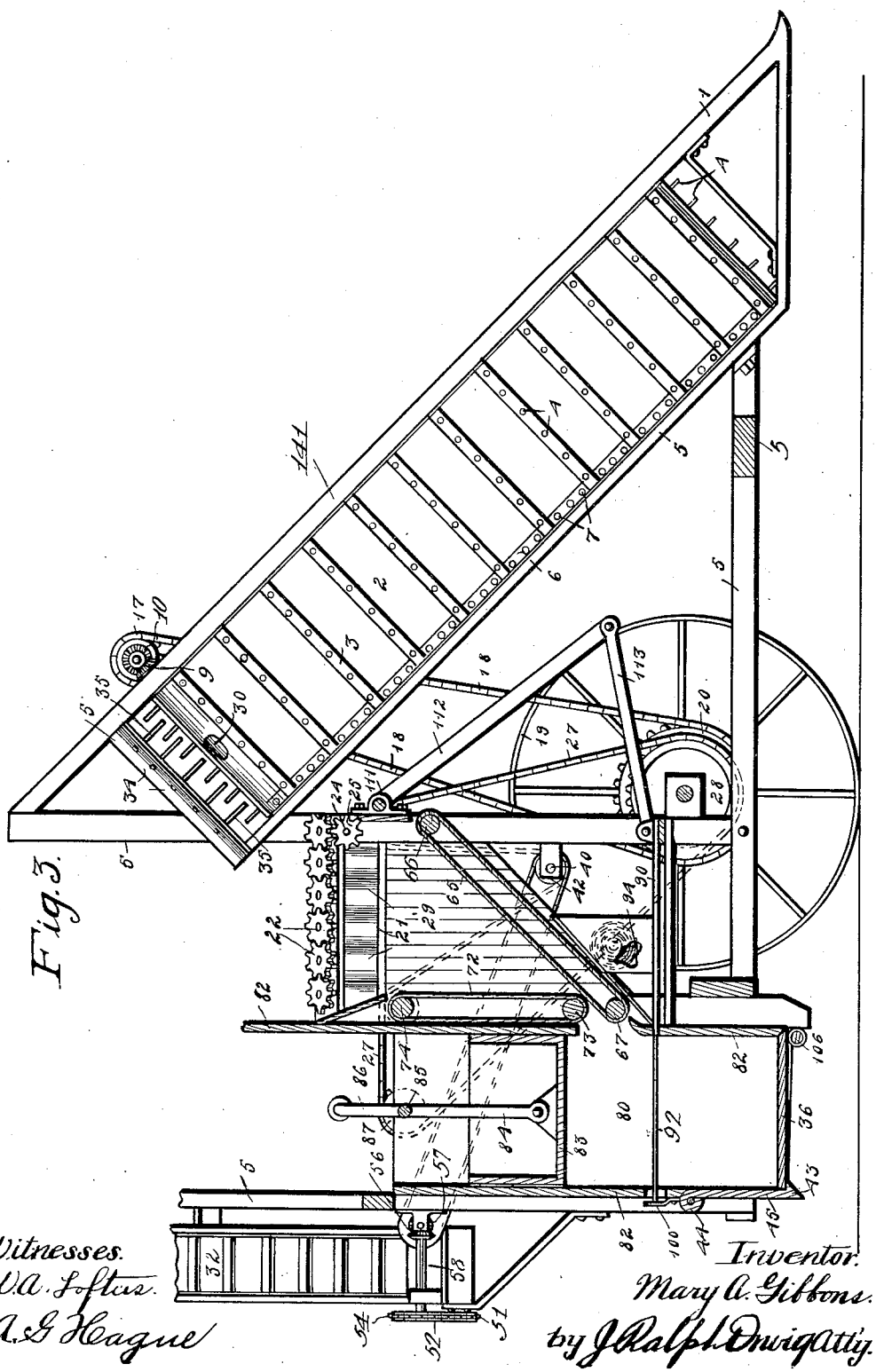

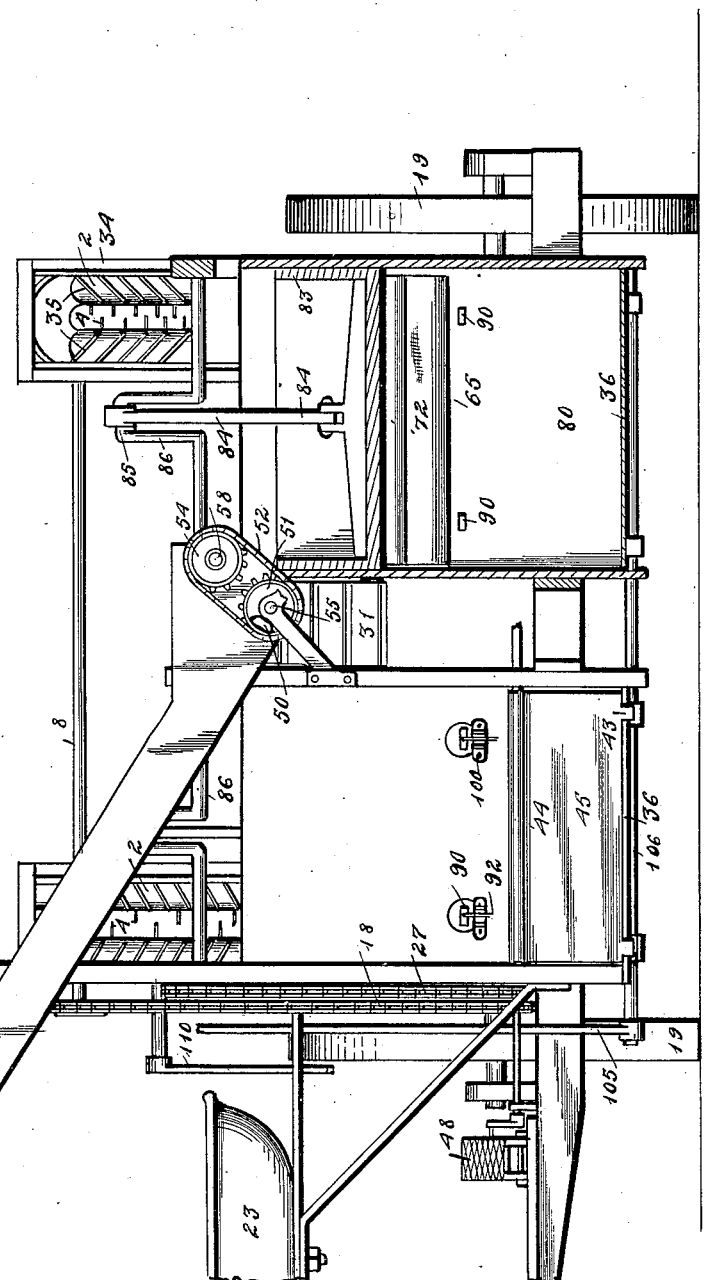

UNITED STATES PATENT OFFICE.

MARY A. GIBBONS, OF WALNUT, IOWA.

CORN-HARVESTER AND HUSK-BALER.

1,017,625.  Specification of Letters Patent.  Patented Feb. 13, 1912.

Application filed December 23, 1910. Serial No. 598,993.

*To all whom it may concern:*

Be it known that I, MARY A. GIBBONS, a citizen of the United States, residing at Walnut, in the county of Pottawattamie and State of Iowa, have invented a certain new and useful Corn-Harvester and Husk-Baler, of which the following is a specification.

The object of my invention is to provide an improved machine of simple construction for stripping the ears, leaves and the softer parts which are useful for fodder from standing stalks of corn.

A further object is to provide means for removing husks from the ears of corn.

A further object is to provide simple and inexpensive mechanism for delivering the husked ears into a wagon box or other receptacle.

It is a further purpose of my invention to provide simple, inexpensive and durable and efficient mechanism for packing in bundles with baling twine around them the husks, leaves and parts of the stalks suitable for fodder so that said husks, leaves and parts of the stalk may be readily tied by the operator into bales and thus saved in convenient form for future use.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a machine embodying my invention. Fig. 2 shows a top or plan view of same. Fig. 3 shows a vertical, sectional view on the line *x—x* of Fig. 2, the box for receiving the husks and the bales being shown in section. Fig. 4 shows a rear elevation of a machine embodying my invention, partly in section, to illustrate one of the boxes for baling the husks and its accompanying mechanism. Fig. 5 shows a detail, horizontal, sectional view through the baling boxes illustrating the mechanism for applying the binding twine. Fig. 6 shows a perspective view of the retaining device for holding the binding twine, and Fig. 7 shows a perspective view of a completed bale of husks.

Referring to the accompanying drawings, I have used the numeral 5 to indicate generally the frame of the machine. Extending downwardly and forwardly from the frame mentioned are conveyer frames, the members 140 and 141 of which are spaced apart so that stalks of corn may come between them and are spread apart at their lower ends to form gathering arms 1. Each of the said members 140 and 141 is preferably constructed in rectangular form, as shown in the drawings, having the lower corner cut away as shown, the planes of the said members, when the parts of the machine are assembled, being at right angles to the surface on which the machine stands. Upon the said conveyer members 140 and 141 I provide endless canvases 2 which travel upon rollers 30 rotatably mounted near the ends of said members. Across the endless canvases are fastened slats 3 in which are set teeth or pins 4. Belts 6 are attached longitudinally to the canvases at their lower edges and in the said belts are fastened pins 7 similar to the pins 4. The pins 7 on the opposite belts extend toward each other on the inner side of the members 140 and 141. The canvases 2 travel upwardly and rearwardly on the inner sides of the members 140 and 141 respectively upon the rollers 30. As the canvases move upwardly the pins 4 tear the ears, leaves and softer parts from the stalks of corn and the said ears, leaves and parts drop upon the pins 7 which may be longer than the pins 4 and are designed to prevent the ears, leaves and parts from falling to the ground and to carry them upwardly to the husking rollers hereinafter described. In the upper end 34 of the conveyer frame teeth or pins 35 are arranged to alternate with the pins 4 and to catch any ears that might become attached to the pins 4.

In the drawings, the gathering arms and accompanying mechanisms are shown constructed in duplicate. The rollers 30 at the upper and rearward ends of the conveyer frames have at their upper ends the beveled gears 9, 12, 13 and 16 which are in mesh with the beveled gears 10, 11, 14 and 15 respectively, the latter beveled gears being mounted on the shaft 8 which extends across the machine. Upon the end of the shaft 8 is the sprocket 17.

The numeral 21 indicates the rollers which may be round or fluted and are designed for the purpose of removing the husks from the corn. Mounted upon the outer end of the rollers 21 are the gears 22 in mesh with each other. There are preferably two sets of the husking rollers, one on each side of the machine and the forward gear 22 of one set is in mesh with a gear 25 (Fig. 3) and the forward gear 22 of the other set is in mesh with a similar gear, not shown in the drawing, at the other end of the shaft 24 which extends across the machine and has mounted upon one of its ends the sprocket 26. Said husking rollers are inclined downwardly from the side toward the center of the machine where they deliver the ears upon the endless conveyer 31 (Fig. 2). The conveyer 31 travels upon the rollers 59 and 42 which are rotatably mounted at each end of the said conveyer. The roller 42 at the lower end of the conveyer 31 is mounted on the shaft 40, the sprocket 41 being mounted at the end of said shaft 40. In Fig. 3 the conveyer 31 is shown by dotted lines. Ears of corn are delivered by the conveyer 31 upon the conveyer 32 which extends from a point near the upper center of the rear of the machine to a point beyond the plane of the side thereof. The conveyer 32 travels upon rollers rotatably mounted at either end. The roller 50 (Fig. 4) at the lower end of the conveyer 32 is mounted upon the shaft 55 at the outer end of which is the sprocket 51. The roller 59 (Fig. 2) at the upper end of the conveyer 31 is mounted upon the shaft 69 which has at the end a beveled gear 57 in mesh with a beveled gear 56, mounted on the shaft 58 which extends rearwardly to a point slightly beyond the frame of the conveyer 32. The sprocket 54 is mounted upon the outer end of the shaft 58. The chain 52 travels upon the sprockets 54 and 51.

After the husks are removed from the ear by the rollers 21 the husks, leaves and portions of the stalk drop between the rollers into the box 29 below, upon the endless conveyer 65, which extends across the bottom of said box 29 being inclined from the forward side thereof downwardly and rearwardly. The endless conveyer 72 is mounted perpendicularly in the rear of the box 29 and assists in feeding the husks and leaves into the box 80 the front wall of which is indicated by the numeral 82. These conveyers are of ordinary construction. As shown by the drawings the conveyer 65 is mounted at the ends upon the rollers 66 and 67. The roller 66 is mounted upon the shaft 64 and the roller 67 is mounted on the shaft 68 at the end of which is fixed the gear 69 in mesh with the gear 76 mounted on the shaft 75. The conveyer 72 is mounted at its ends upon the rollers 73 and 74. The roller 74 is mounted on the shaft 78 at the end of which is fixed the sprocket 79. The roller 73 is mounted on the shaft 75 at the end of which is fixed the gear 76 which is in mesh with the gear 69.

In the box 80 is the plunger 83 designed to work up and down in said box and to firmly pack the husks, leaves and fodder. Pivotally connected with the plunger 83 on its upper side is the connecting arm 84 which, at its upper end, is rotatably mounted on the crank pin 85 of the crank shaft 86. The sprocket 87 is mounted upon the end of the crank shaft 86.

Figs. 5 and 6 show the mechanism whereby the binding twine is applied to the fodder. Balls of twine 94 (Fig. 3) are placed in ordinary twine boxes. 90 indicates needles which have at their points eyes 91. Said needles are preferably two in number for each box 80 and normally lie horizontally just under the boxes 29 with their points toward the box 80. In the sides of the box 80 are cut slots 88 to serve as guides for the needles. Said needles are designed to be driven across the box 80 by the mechanism hereinafter described. At the end of each needle, farthest from the box 80, is pivotally attached a link 113. At the other end of the link 113 is pivotally attached the connecting rod 112 which extends upwardly in the machine and at its upper end is rigidly secured to the rock bar 111 which extends through the machine. Each needle is connected in the same way with the said rock bar 111. At the outer end of the said rock bar is rigidly secured a lever 110. At the side of the box 80, opposite the needles, is attached the thread retaining device 100, there being one of said devices opposite the point of, and designed to coöperate with each needle. The said retaining device 100 comprises two spring members 103 and 104 which, at their upper ends, are spread apart to form the lips 101 and 102 and are designed to receive and hold firmly the binding twine. The twine 92 from balls 94 is threaded through the eyes 91 of the needles 90 across the box 80 to the retaining device 100 in which it is held between the spring members 103 and 104. The bottom 36 of the box 80 is hinged thereto by the rock bar 106. Rigidly attached to the rock bar 106 and extending upwardly therefrom is the lever 105. At the rear of the box 80 is a door 45 hinged at its upper end to the frame of said box by the rock bar 44 and having on its lower side a catch 43 designed to engage and hold the bottom 36. The spring 46 is attached at one end to the door 45 on its inner side and at the other end to the frame of the box 80 and is designed to hold the door 45 normally in closed position. Extending upwardly from the rock bar 44 and rigidly attached thereto is the short arm 47. Pivotally attached to the arm 47 is a connecting rod 49 which extends forwardly in the machine and is attached to the foot lever 48 which is of ordinary construction and is placed in convenient position below and in front of the seat 23 of the operator, which seat is placed at the side of the machine and attached to the frame thereof.

The endless chain 27 travels over the sprocket 28 attached to the master wheel 19 and over the sprockets 87, 79, 41 and 26, heretofore described. The endless chain 18 travels over the sprocket 20 attached to the master wheel and over the sprocket 17.

The machine is preferably constructed to husk two rows of corn at once and in such a machine gathering arms, the husking rollers, the box thereunder, the conveyers 65 and 72, the box 80 and the baling mechanism with the necessary operating mechanism in each case are constructed in duplicate on each side of the machine. Power is secured from one of the large wheels 19 by means of sprockets 20 and 28 attached thereto. It is not material which large wheel is so used. The shafts 8, 24, 40, 68, 75 and 78, the rock bars 111, 106 and 44 and the crank shaft 86 extend through the machine from side to side.

In the operation of the machine the gathering arms bring the stalks of corn between the members 140 and 141 of said arms; the ears of corn, leaves and softer portions of the stalk are pulled from the stalk by the pins 4 attached to the moving canvases 2. The ears are prevented from dropping to the ground by the pins 7 and are carried to the rollers 21 by the canvases and the pins therein. The husks are torn off by the rollers 21 and with the leaves and fodder are dropped between them into the boxes 29. The ears gradually roll down the inclined rollers 21 to the conveyer 31 by which they are elevated to the conveyer 32 which delivers them to the wagon bed. The husks, leaves and fodder are fed into the box 80 by the conveyers 61 and 72, and are then packed firmly by the plunger 83. The husks and fodder drop into the box 80 above the twine 92 and push the twine to the bottom of the box. When the box 80 is full the operator pulls the lever 110 toward him and the needles 90 are driven across the box 80 until their points are almost in contact with the twine retaining device 100. The operator can then tie the fodder into bundles or bales such as the one shown in Fig. 7. The operator may empty the box 80 by opening the bottom 36 by hand, or by pressing upon the foot lever 48. The bottom 36 may then be raised by hand or by means of the lever 105 and the rock bar 106.

An important advantage of my machine is that it strips from the corn stalk not only the ears but also the leaves and the softer upper parts which are useful for fodder. Another advantage is that these parts are removed from the stalk by the same means by which the ears are stripped off and at the same time.

Another advantage lies in the extreme simplicity of the means, namely the pins 7, employed for carrying the loose ears and fodder to the husking rollers. The pins 35 in the upper end of the members 140 and 141 prevent the carrying over of any of the parts taken from the stalk.

Still another advantage is found in the baling apparatus by which the valuable fodder is baled and made available in convenient form for future use.

I claim as my invention:

1. In a corn harvester, a frame, gathering frames extending downwardly and forwardly therefrom in planes at right angles to the surface on which the machine rests, comprising parallel members substantially rectangular in shape, spaced apart to receive between them standing stalks of corn and spaced apart at their forward ends to form gathering arms, rollers rotatably mounted near the ends of said members, endless aprons of strong flexible material mounted on said rollers and designed to travel upwardly and rearwardly on the inner sides of said members, transverse slats on said endless aprons, pins set in said slats designed to strip from stalks of corn, the ears, leaves and soft portions suitable for fodder, strips of strong flexible material fastened to the lower edges of said endless aprons, pins set in said strips, said pins being of such length that the pins in one of said strips almost touch the pins in the opposite strip, said pins being composed of strong rigid material and being designed to carry the parts torn from the stalks.

2. In a corn harvester, a frame, gathering frames extending downwardly and forwardly therefrom in planes at right angles to the surface on which the machine rests, comprising parallel members substantially rectangular in shape, spaced apart to receive between them standing stalks of corn and spaced apart at their forward ends to form gathering arms, rollers rotatably mounted near the ends of said members, endless aprons of strong flexible material mounted on said rollers and designed to travel upwardly and rearwardly on the inner sides of said members, transverse slats on said endless aprons, pins set in said slats designed to strip from stalks of corn, the ears, leaves and soft portions suitable for fodder, strips of strong flexible material fastened to the lower edges of said endless aprons, pins set in said strips, said pins being of such length so that the pins in one of said strips almost touch the pins in the opposite strip, said pins being composed of strong rigid material and being designed to carry the parts torn from the stalks, pins secured to the upper ends of the said frame members and designed to prevent the carrying of material around said upper ends by the pins in said strips.

Des Moines, Iowa, November 21, 1910.

MARY A. GIBBONS.

Witnesses:
M. WALLACE,
M. B. PETERSON.

Copies of this patent may be obtained for five cents each, by addressing the "Commissioner of Patents, Washington, D. C."